US008599435B2

(12) United States Patent
Paul et al.

(10) Patent No.: US 8,599,435 B2
(45) Date of Patent: Dec. 3, 2013

(54) PHOTORECEPTOR MOTION QUALITY ESTIMATION USING MULTIPLE SAMPLING INTERVALS

(75) Inventors: Peter Paul, Webster, NY (US); Claude S. Fillion, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1056 days.

(21) Appl. No.: 12/617,117

(22) Filed: Nov. 12, 2009

(65) Prior Publication Data

US 2011/0109921 A1 May 12, 2011

(51) Int. Cl.
*G06F 15/00* (2006.01)

(52) U.S. Cl.
USPC ............. 358/1.9; 358/1.4; 358/1.6; 358/1.12; 399/309; 399/354; 318/34; 318/41

(58) Field of Classification Search
USPC ............ 358/1.9
See application file for complete search history.

(56) References Cited

U.S. PATENT DOCUMENTS

| | | | |
|---|---|---|---|
| 7,058,325 B2 | 6/2006 | Hamby et al. | |
| 7,120,369 B2 | 10/2006 | Hamby et al. | |
| 7,492,381 B2 | 2/2009 | Mizes et al. | |
| 2006/0092257 A1* | 5/2006 | Dejong et al. | 347/116 |
| 2007/0052991 A1 | 3/2007 | Goodman et al. | |
| 2007/0236747 A1 | 10/2007 | Paul | |
| 2009/0002724 A1 | 1/2009 | Paul et al. | |

OTHER PUBLICATIONS

U.S. Appl. No. 12/555,308, filed Sep. 8, 2009, Ramesh et al.

* cited by examiner

*Primary Examiner* — Twyler Haskins
*Assistant Examiner* — Brendan McCommas
(74) *Attorney, Agent, or Firm* — Philip E. Blair; Fleit Gibbons Gutman Bongini & Bianco P.L.

(57) ABSTRACT

What is disclosed is a novel system and method for determining printer component velocity variations by analyzing multiple page test patterns. A test pattern, such as ladder chart targets, is produced that extends across multiple pages. Corresponding page sync signals are recorded and used to maintain phase coherence when analyzing scanned images associated with the multiple pages. An algorithm determines the ladder rung positions and the average photoreceptor velocity between each ladder rung on each scanned image for each page. Interpolation is used for proper phase alignment of the velocity data that spans multiple pages. The long assembly of phase coherent velocity data is then analyzed in one embodiment to determine its frequency content and to estimate the photoreceptor motion quality error sources. Based upon these estimated error sources, a trouble condition or pending maintenance problem with the printer is able to be indentified.

21 Claims, 6 Drawing Sheets

PHOTORECEPTOR MOTION QUALITY ESTIMATION USING MULTIPLE SAMPLING INTERVALS

TECHNICAL FIELD

The present invention is directed to systems and methods for analyzing photoreceptor motion quality through component velocity variations in a document reproduction system.

BACKGROUND

Automated techniques for printer system output quality assurance and component failure detection provide improved printer system reliability. Errors in photoreceptor motion quality can often result in density non-uniformities in the direction of the printing process on the printed page. Due to the mechanical design of printing systems, these defects (often referred to as "bands") are often periodic in nature resulting in a "banding" defect appearing on the printed page. Numerous techniques have been developed for measuring banding sources in an effort to deal with banding defects. Many of these techniques involve the use of halftone targets to directly measure banding density variations while others measure banding by using ladder charts to measure variations in photoreceptor surface velocity.

Printing ladder charts can give very accurate photoreceptor velocity measurements but are mainly useful for banding sources that result in photoreceptor surface velocity variations. Such banding sources include: deterioration in the performance of the photoreceptor motor, gear, gear teeth; drive train run out and tolerances; servo control or stepper motor control errors; and photoreceptor surface out-of-round errors particularly as the photoreceptor surface wears with component age.

Current techniques for photoreceptor motion quality estimation through the use of printed ladder charts are limited to analysis of relatively high photoreceptor velocity variation frequencies with poor frequency resolution due to the limited data length available by printing a single page. Some printer systems have photoreceptors that are many pages long. As such, analyzing banding on a single page provides information for only a fraction of photoreceptor revolution. Other printing systems that use, for example, a drum photoreceptor, may capture only a few revolutions of the photoreceptor drum. Printing and analyzing a longer page, such as an 11"× 17" page, can provide more information, but the limited length of banding data can limit frequency resolution and accuracy at low banding frequencies, which are limitations of analysis using a single printed page.

Accordingly, what is needed in this art are increasingly sophisticated systems and methods for analyzing photoreceptor motion quality in a document reproduction system.

BRIEF SUMMARY

What is disclosed is a novel system and method for determining printer component velocity variations by analyzing low and high frequency components of banding defects produced by component velocity variations in photoreceptor motion quality in a multifunction document reproduction system. In one embodiment hereof, a test pattern, such as ladder chart targets, is produced that extends across multiple pages. Corresponding page sync signals are recorded and used to maintain phase coherence when analyzing scanned images associated with the multiple pages. Interpolation is used for proper phase alignment of the velocity data that spans multiple pages. The long assembly of phase coherent velocity data is then analyzed to determine its frequency content. Photoreceptor motion quality is then estimated based upon these error sources. Periodic velocity source profiles can be provided to the PR servo control system to compensate for predictable velocity error sources. Another embodiment includes processing to eliminate extraneous tones that result from the windowed sampling constraint of printing the ladder chart target on cut sheet output pages.

In one example embodiment, the present method for analyzing photoreceptor motion quality involves performing the following. A number of patterns are first exposed onto a photoreceptor within a document reproduction system having an exposure module and a moving photoreceptor. Each of the patterns has image components that are transverse to a motion of the photoreceptor. Each of the patterns is exposed at time intervals separated from one another. A respective start of a given pattern time for each of the patterns is stored. Each respective pattern time start relates to a respective start time for the exposing of the respective pattern. Upon exposure, a number of images are created. Each respective image is based upon a respective pattern. The images are then analyzed to produce a respective image analysis for each image. A motion variation of the photoreceptor during the exposing of the various patterns is thereafter determined by a combination of the respective pattern start times and an analysis of the respective images. Information derived therefrom relates to motion variations in the photoreceptor. The data can then be output. An estimate of photoreceptor motion quality can be used to diagnose system errors and a trouble condition or pending maintenance problem with the device can be indentified and addressed by a device technician accordingly.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
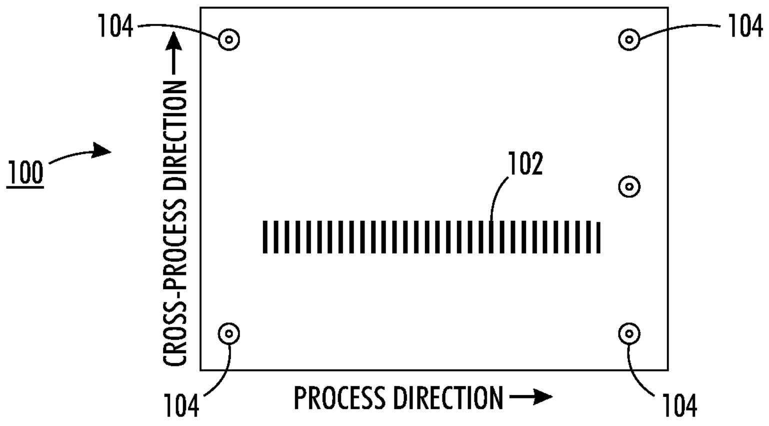
FIG. 1 illustrates an example ladder test target page containing a ladder chart target as utilized by one embodiment of the present method for determining photoreceptor motion quality.

What is disclosed are a novel system and method for determining printer component velocity variations by analyzing low and high frequency components of banding defects produced by component velocity variations in photoreceptor motion quality in a multifunction document reproduction system. Based upon the velocity variations, determined in a manner as described herein further, a maintenance cycle can be initiated and compensated for accordingly.

It should be understood that one of ordinary skill in this art should be readily familiar with the printer quality monitoring and troubleshooting techniques employed herein, particularly those which directly relate to detecting and quantifying photoreceptor motion variations in a printer's output, analysis of scanned images to determine frequency spectra of motion variation components, correlating observed motion variations to conditions and failures within or identification of required maintenance of a printer, and frequency analyses of scanned images of test patterns containing periodic structures. One of ordinary skill would also be knowledgeable about computer science, and software and hardware programming systems and methods sufficient to implement the functionality and capabilities described herein in their own document system environments without undue experimentation.

Definitions

The term "printer" as used herein refers to any simple printing device, or complex multifunction device, that is capable of marking a media substrate such as paper, transparency, film, or any other output medium including memory and storage devices for data storage and subsequent retrieval. The set of such devices to which the present system and method are directed is intended to encompass a wide variety of digital document printers/copiers, book/magazine/newspaper and other digital printing presses, and other multi-function document reproduction systems. Such devices and systems generally include a display such as a CRT or touch screen along with one or more user interfaces such as a keyboard, mouse, keypad, touchpad, and the like, for entering data and configuring device-specific settings to optimize image quality and performance. Complex multifunction print devices that are likely to utilize the teachings hereof will incorporate the functionality of multiple photoreceptors, such as a separate photoreceptor for each of four or more printed color components produced, a common intermediate belt to receive the toner image from each of the multiple photoreceptors, internal sensors for monitoring the common intermediate belt, and internal sensors for monitoring the photoreceptors. The internal sensors for monitoring the intermediate belt and those for monitoring the photoreceptors may or may not be the same sensors. One or more functions, features, or capabilities provided by a computer system or special purpose processor (such as an ASIC) designed to perform various aspects of the present method, as described more fully herein, may be integrated, in whole or in part, with any system or sub-system of such a multifunction device.

A "photoreceptor" refers to a device within a printer that is able to be exposed with a signal defining an image that is to be printed onto a medium. Photoreceptors are able to be based upon one or more rotating drums with a circumferential surface that accepts, for example, a charge and exposure of the pattern on that surface removes the charge from the exposed area. Further photoreceptors are able to be based on belts that have a similar surface that accepts a charge and is able to be exposed to selectively remove the charge from the exposed areas.

Printing "process direction", as used herein, refers to the direction in which a printing process proceeds, such as the direction of movement of a medium such as a photoreceptor surface, intermediate imaging belt, or output media such as an output sheet of paper. Whereas, the "cross-process" direction (or "fast scan" direction) is orthogonal to the direction in which the printing process proceeds, i.e., perpendicular to the movement of the media as it traverses a photoreceptor surface, intermediate imaging belt, or other mechanism for marking the surface of the media.

Example Printed Target Pages

Reference is now made to FIG. 1 which illustrates an example ladder test target page containing a ladder chart target as utilized by one embodiment of the present method for determining photoreceptor motion quality.

In FIG. 1, the example ladder test target page 100 includes ladder chart target 102 which consists of a series of short line segments in the cross-process direction. The illustrated example ladder chart target includes a number of lines that are uniformly spaced in the process direction, such as in a 1-pixel-on, 11-pixel-off pattern. Such a 1-pixel-on, 11-pixel-off pattern therefore has a period of 12 pixels. This pattern forms a "ladder" in the process direction with image components that are transverse to a motion of the photoreceptor. Since the rungs of the ladder repeat at a constant integer number of scan lines, which generally correspond to a number of printed pixels, the rungs are imaged onto the photoreceptor at equal time intervals and include uniformly spaced parallel lines that are transverse to the motion of the photoreceptor. However, due to conditions within the printing system, which generally induce photoreceptor surface speed variations, the rungs may not end up as being printed with equally spaced distance periods on the printed page. The ladder test target page includes one or more fiducial marks 104. Fiducial marks are identifiable marks that are printed at known locations on a page in order to establish a base point from which to measure other features printed on the page. The printed ladder chart is then analyzed using well known image processing techniques to extract the ladder rung positions. Since the time interval between the imaging of uniformly spaced ladder chart rungs onto a photoreceptor within a printer is constant, any deviation in the distance between ladder rungs within an image produced by the printer corresponds to an equivalent velocity deviation of the photoreceptor. Thus photoreceptor surface velocity variation can be extracted from the printed ladder chart. The image that contains the different ladder rung spacing is able to be observed, for example, on the photoreceptor itself, on intermediate paths within the printer that convey a copy of the toner image created in the photoreceptor (such as on an intermediate belt), or on the printed page itself.

Alternatively, multiple page ladder charts may be utilized that include multiple printed pages that each includes ladder chart target 102 to increase the length of data that is able to be analyzed. Assembling data that are printed across multiple pages provides more time domain sample points over a longer time period that are able to be used in a printer output analysis. The greater number of sample points collected over a much longer time period improves the available frequency resolution, lower frequency range, and amplitude accuracy produced by a discrete time, frequency domain transform of the collected data. Conventional ladder chart analysis, however, does not include methods to coherently stitch together data from multiple page ladder charts that are printed across multiple sheets of paper. One embodiment of the present method coherently stitches together ladder chart data from multiple pages by incorporating machine timing data in an associated algorithm described in detail below. The present method provides higher frequency resolution and more accurate amplitude estimation for photoreceptor surface velocity variation based print defects presented in printer system outputs.

The photoreceptor velocity estimates provided by one embodiment of the present method are able to be used to further diagnose failed components in a printing system. Examples of component failure identification include determining, based upon frequency domain information of the photoreceptor velocity obtained from the multiple page ladder chart being analyzed, that the photoreceptor surface is worn unevenly. Information determined from the frequency domain information obtained from the multiple page ladder chart being analyzed is also able to be used in a feed-forward control system to compensate for the predictable velocity errors and reduce the impact of the resulting banding image quality defects on the output of the printer system.

Figure 2:
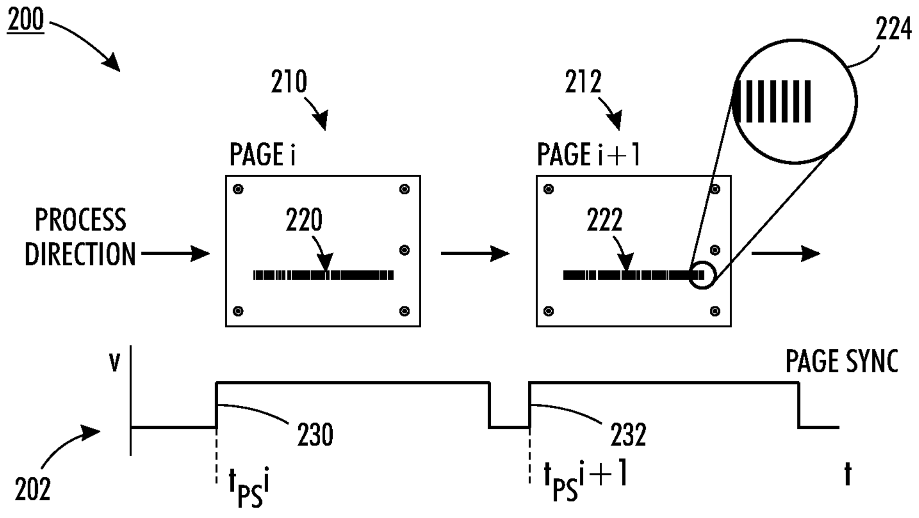
FIG. 2 shows a multi-page print job including ladder marks on pages and page sync data capture, as is used by one embodiment of the present method.

Reference is now made to FIG. 2, which is a multi-page print job including ladder marks on pages and page sync data capture 200, as is used by one embodiment of the present method.

In FIG. 2, two printed pages of the illustrated multi-page print job are shown page i (at 210) and page i+1 (at 212). Each page includes a respective ladder chart with ladder marks 224. Page i includes a first ladder chart 220 and page i+1 includes a second ladder chart 222. Each of the two ladder charts begins at the start of printing for its respective printed page. The device used to produce the multi-page print job produces a page sync signal 202, which is also sometimes referred to as a "page request" signal, to synchronize the printing process with the start of each physical page. The page sync signal is "asserted" at a time that has a well defined relationship to the start of printing the image onto a given page. For example, page i includes a ladder chart that starts printing at a pre-defined, constant time after the page sync signal 202 is asserted at $t_{PS}i$ (at 230). Similarly, page i+1 includes a ladder chart that starts printing at a pre-defined, constant time after the page sync signal 202 is asserted at $t_{PS}i+1$ (at 232). The page sync timing data is recorded and used by the analysis processing (described below with respect to analysis processor 306 of FIG. 3) to align the phase of the multiple page ladder chart data order to form one coherent time series of data.

Example Print System

Figure 3:
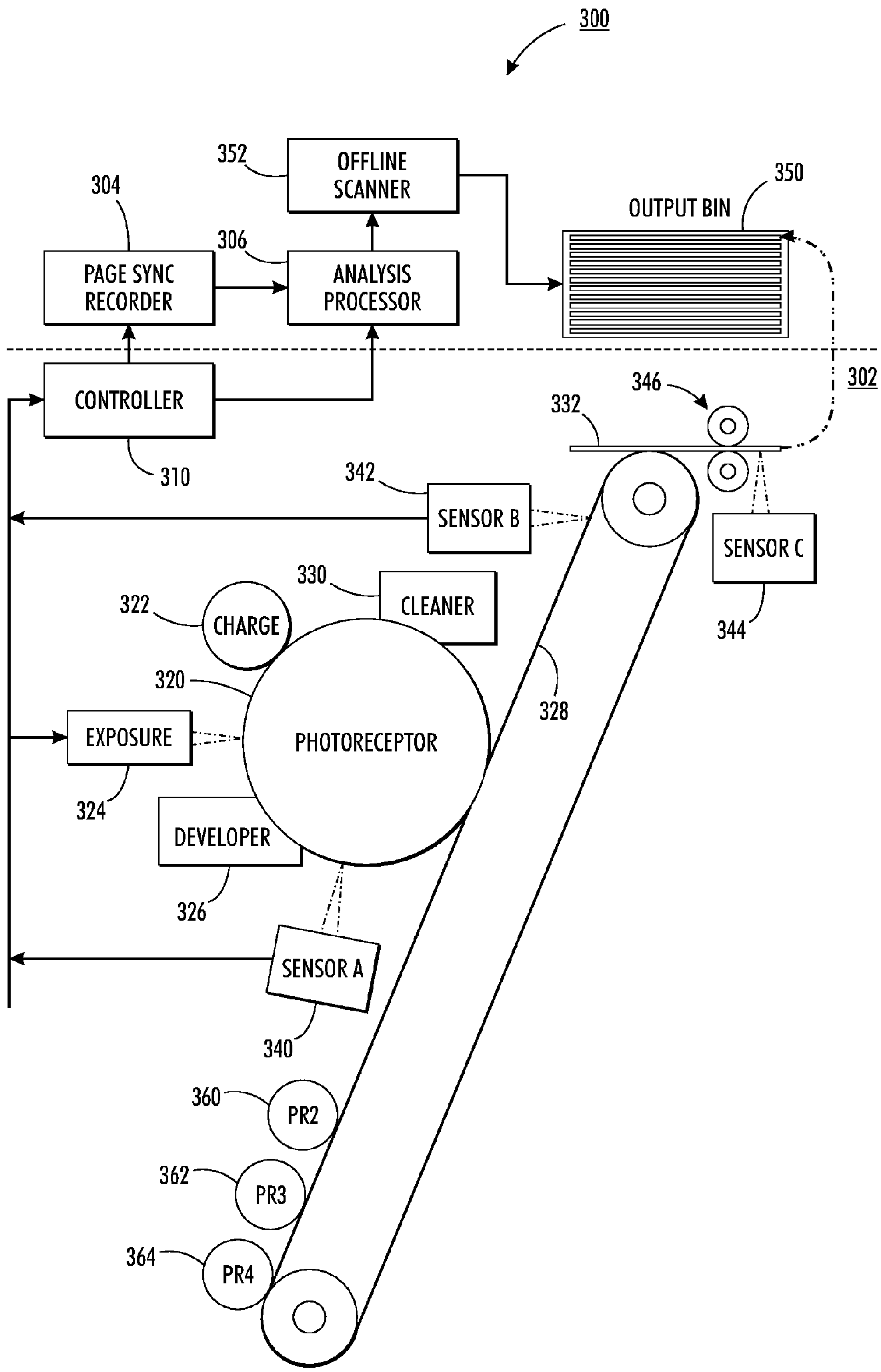
FIG. 3 is a component diagram illustrating an example digital document reproduction system and an associated photoreceptor motion analysis system, suitable for utilizing various embodiments of the present component velocity variations analysis method.

Reference is now made to FIG. 3 which is a component diagram illustrating an example digital document reproduction system and an associated photoreceptor motion analysis system 300, suitable for utilizing various embodiments of the present component velocity variations analysis method.

The illustrated digital imaging system includes a printer 302 with imaging components as described below. In the illustrated example, the printer includes a moving photoreceptor 320 that operates in conjunction with charge roller 322, and an exposure module including exposure laser 324 or other light source. A developer station 326 follows the exposure module. The exposure laser receives image data defining, for example, a pattern for each printed page from controller 310 and exposes each of those patterns or images onto the photoreceptor. The developer station 326 operates, in conjunction with the deposited charge on the photoreceptor, to deposit a toner image corresponding to the image exposed onto the photoreceptor. The toner image on the photoreceptor is then transferred, in one embodiment, to a media, such as intermediate belt 328. Further embodiments of the present invention are able to operate to transfer the toner image to an output media that is directly output from the printer, such as a paper output. Printed output 332, which has a toner image transferred thereto, is processed by a fusing station 346 to fix the toner image to the output media. The cleaner 330 removes unused toner from the photoreceptor and prepares portions of the photoreceptor to be again processed by charge roller 322 and the subsequent components, as is described above, to print a next image onto a next output media 332, such as a sheet of paper.

In one embodiment, the printer 302 is a color tandem xerographic printer. In a color tandem xerographic printer, the intermediate belt 328 is in contact with additional photoreceptors similar to the photoreceptor 320 described above. Each photoreceptor in contact with the intermediate belt 328 is used to form images in a color of toner used by the printer. The illustrated printer 302 represents a four color printer with a photoreceptor 2 (P.R. 2) 360, a photoreceptor 3 (P.R. 3) 362, and a photoreceptor 4 (P.R. 4) 364 are also shown in contact with the intermediate belt 328. In order to simplify the description of an embodiment of the present invention, the additional components in contact with the photoreceptor 2 360, the photoreceptor 3 362, and the photoreceptor 4 364 are not shown nor described in detail. In one embodiment, as is understood by a practitioner of ordinary skill in the art in light of the present discussion, the photoreceptor 2 360, the photoreceptor 3 362, and the photoreceptor 4 364 are in contact with and operate in conjunction with similar components described above with respect to photoreceptor 320, such as charge roller 322, exposure laser 324, developer 326, cleaner 330, and potentially a sensor comparable to sensor A 340.

In the illustrated example, the toner image transferred to the intermediate belt is transferred to the paper, along with processing of a fusing station 346, as an output of printer 302. Multiple sheets of paper, each with a respective pattern are able, for example, to be collected in output bin 350.

The above components all interoperate conventionally in one embodiment. These components operate in a conventional manner to transfer an image to an output media in a manner which is well understood in this art. Other components, such as, for example, transfer stations, and the like, are not shown nor described for brevity as such other components and their interoperability are well understood by practitioners in this art.

Different embodiments hereof capture images of the toner image at various locations within the printer or by scanning printed images produced on paper. In one embodiment, several sheets of printed paper onto which toner images defining, for example, a ladder chart pattern are transferred to each respective sheet of paper. These several sheets of paper are collected in the output bin and then optically scanned by scanner 352. Collecting sheets of printed paper in the output bin requires allocating printing resources to produce those sheets of paper, which contain specialized images, such as the ladder chart depicted in FIG. 1, described above, that are used to detect motion irregularities in the photoreceptor. As an alternative to producing, collecting, and scanning special printed sheets of paper produced by printer, other embodiments of the present method include one or more internal printer sensors to capture images of the toner image at various locations within the printer.

Also shown in FIG. 3 are several printer sensors, sensor A (at 340), sensor B (at 342) and sensor C (at 344). Alternative embodiments hereof include one or more of the illustrated internal printer sensors or other suitably placed sensors that are able to capture an image of the toner image produced on the photoreceptor as that toner image is present on a surface within the printer, such as the photoreceptor, intermediate belt, printed paper, and the like. Such embodiments are able to operate without internal printer sensors and collect information by scanning printed pages collected in output bin 350. In one embodiment, printed pages collected in the output bin are transferred to scanner 352, where the multiple printed pages are scanned and images produced. The images produced by the offline scanner in one embodiment are provided to an analysis processor 306, which performs the analysis processing described below.

Sensor A operates to sense and thereby capture an image of the toner image forming, for example, the ladder chart pattern that is adhered to the photoreceptor 320 in response to exposure by laser 324 and after toner is deposited by developer station 326. Sensor B captures an image of the toner image of the toner image forming, for example, the ladder chart pattern that is present on an intermediate transfer media, such as the intermediate belt 328, after the toner image was transferred from the photoreceptor. Sensor C is an internal printer sensor that operates to capture and thereby create an image of the image that is produced on the printed sheet of paper. Various digital document reproduction system designs are able to place sensor C so as to sense output 332 either before or after output 332 is processed by fuser 346. In one embodiment, sensor C is an alternative to collecting and manually scanning the pages produced by the printer. In one embodiment, the internal printer scanners operate to progressively scan images as they progress past the scanner, such as by rotation of the photoreceptor, intermediate belt, or paper.

The locations of the various illustrated sensors, such as sensor A 340, sensor B 342 and Sensor C 344, have associated advantages. Sensor A 340 senses the image formed on the photoreceptor 320 itself and generally is able to sense images with high signal to noise ratios. In a device with multiple photoreceptors, however, a separate sensor A 340 is required for each photoreceptor. The design of some digital document reproduction systems strive to minimize print engine size, and placing the multiple sensor A 340 devices for each photoreceptor may be a challenge. Sensor B 342 is able to be realized with a single sensor, but may be exposed to additional motion disturbance sources and may produce lower signal-to-noise ratios than Sensor A 340. The design criteria for many digital document reproduction systems select one sensor B 342. Sensor C 344 which is built into the digital document reproduction system has an advantage of automatically monitoring images that are printed onto the output 332.

Various embodiments hereof capture a length of the image in the cross-process direction or alternatively use a spot sensor to monitor one spot on a page that corresponds to a column in the process direction that is a fixed number of pixels wide in the cross-process direction. The images captured by the internal printer sensors of one embodiment are collected by controller 310 during periods in which test target images, such as ladder charts, are present on the surface being monitored. The captured images are provided to analysis processor 306. The use of internal printer sensors effectuates the capture of toner images without actually producing a printed page output containing the ladder chart target page. For example, a printer is able to be configured to form a ladder chart target image onto the photoreceptor and that toner image is then captured by monitoring the photoreceptor with sensor A or monitoring the intermediate belt with sensor B. In either case, the step of actually transferring the toner image to paper is not mandatory and can be omitted.

Such internal printer sensors (340, 342, and 344) further monitor intermediate components that contain the toner image formed on the photoreceptor further allows some embodiments to form ladder chart target images on the photoreceptor within so called “inter-doc zones” which are portions of the photoreceptor and other intermediate components that are able to form a toner image. Utilizing inter-doc zones to form the target toner images allows the performance monitoring of the present method to be implemented without lessening the throughput of the printer but exist between the images that are to be printed onto the output media. Exposing the test pattern images, such as ladder chart patterns, in the inter-doc zones of the photoreceptor causes the exposing of the test pattern and creating the images of the toner image to be separated by exposing user data that defines at lest one printed sheet onto the photoreceptor. As is described in further detail below, printer timing signals are used to determine the time period between captured images of the toner images, and therefore embodiments that expose test pattern images in the inter-doc zones are able to expose, and capture images of the test pattern images, test pattern images onto inter-doc zones separated exposing the photoreceptor with user data defining many printed sheets of user output. Printing target toner images in the inter-doc zone is able to allow performance increases for the printer since the performance monitoring operations occur during periods when images to be produced on the output media are not being formed. Some systems that print target images in the inter-doc zone of the photoreceptor use a different page sync signal that is produced by controller 310 and stored by the page sync recorder. An inter-doc page sync signal that is recorded in such systems indicates the start of printing onto the inter-doc zone.

In one embodiment, controller 310 produces page sync signals that are provided to the page sync recorder. The page sync recorder stores, in one embodiment, time stamps that indicate a relative time between the start of printed of toner images and/or pages of which images are captured by either an internal printer sensor or offline scanner 352 and provided to the analysis processor. The page sync recorder provides page sync signal information, including start of pattern times for each pattern being exposed onto the photoreceptor, to the analysis processor. Page sync signals are used to assemble multiple images into coherent time domain samples that are able to be processed.

Other embodiments hereof print consecutive sheets containing non test pattern images between sheets that are printed containing test pattern images. For example, one embodiment prints ten sheets of paper containing general user data for output to the user, while every eleventh sheet is printed with a test pattern image, such as a ladder chart image. The sheets that contain a test pattern image are able, for example, to be provided to a special output bin designated to collect the test pattern image sheets. The sheets in this special output bin are then collected and scanned by, for example, the offline scanner. Furthermore, pages with test patterns are able to be produced at non-uniform intervals.

In the case of monitoring the media motion variations of a color printer that produces multiple color components, the ladder charts are printed with rungs that are divided into separate sections for each color component. For a four color printer, for instance, each rung is divided into four sub-lines with each having a length of one fourth of the total rung length wherein each sub-line consists of color that is exposed onto the photoreceptor and is printed with a corresponding color component. The internal printer sensors and/or offline scanner captures the sub-lines in each rung. The captured sub-lines are then provided to the analysis processor wherein each is analyzed separately.

The above described example focuses on the printing operations of a xerographic printer. Further embodiments capture images that are produced by other printing technologies monitor the frequency profile of printer induced media motion errors. For example, printed pages produced by an inkjet printing system could be collected in an output bin, scanned with an offline scanner and processed by the analysis processor using the below described method to identify conditions within the inkjet printer.

Alternative Embodiment

Figure 4:
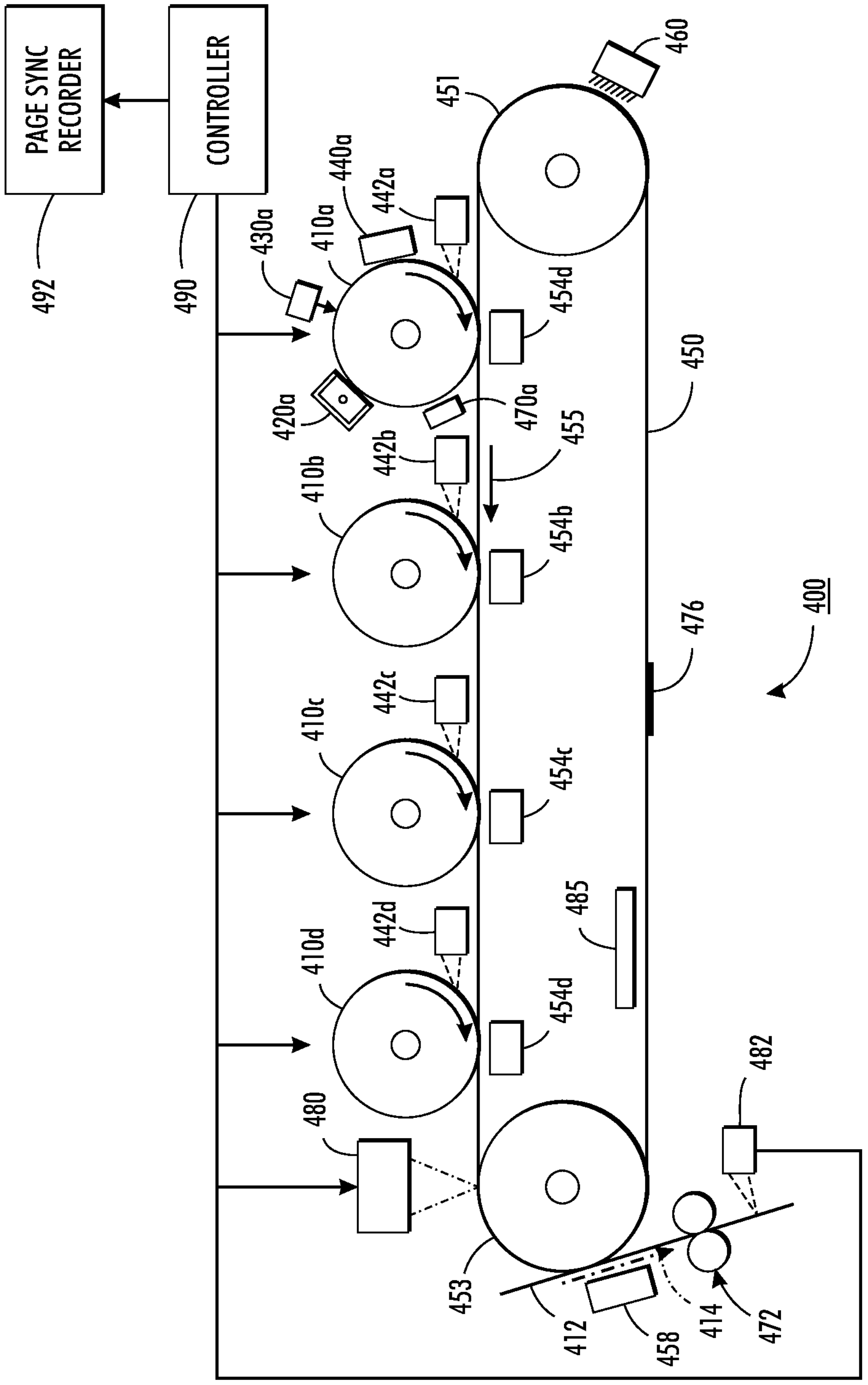
FIG. 4 is a component diagram illustrating an alternative digital document reproduction system that includes a color-tandem architecture and associated photoreceptor motion analysis system, suitable for utilizing various embodiments of the present component velocity variations analysis method.

Reference is now made to FIG. 4 which is a component diagram illustrating an alternative digital document reproduction system 400 that includes a color-tandem architecture and associated photoreceptor motion analysis system, suitable for utilizing various embodiments of the present component velocity variations analysis method. The color tandem architecture illustrated in FIG. 4 includes a multicolor image forming device 400 with a plurality of print stations arranged in series, each of which transfers a different color toner image of a multicolor image to an intermediate transfer member 450. A first photoreceptor drum 410*a* includes a charging device 420*a*, an exposing device 430*a*, a developer device 440*a* and a cleaning device 470*a* disposed around its periphery. The first photoreceptor drum 410*a* further includes an associated sensor A 442*a*, which operates similarly to sensor A 340 described above.

A single color toner image formed on first photoreceptor 410*a* is transferred to intermediate transfer member 450, shown in the form of a transfer belt 450, by first transfer corotron 454*a*. Also, although shown using transfer corotrons 410, alternative transfer mechanisms could be provided, such as known biased transfer rolls. Belt 450 is wrapped around rollers 451, 453 which tension belt 450 and are also driven to move belt 450 in the direction of arrow 455. Second, third and fourth photoreceptors 410*b*, 410*c*, 410*d*, which also include charging, exposing, developing, and cleaning devices (not shown) are used to form and then transfer second, third and fourth single-color toner images to belt 450 (on top of each other) using transfer corotrons 454*b*, 454*c*, 454*d*. Typically, these would include separate stages for each of cyan, magenta, yellow and black (CYMK) colorants. Although four stages are shown, fewer or greater stages can be present. For example, as few as two stages could be provided to print black and a highlight color, or six stages could be provided, CYMK colorants plus red and blue colorants. The second, third and fourth photoreceptors 410*b*, 410*c*, 410*d* are also shown to include respective sensor A devices 442*b*, 442*c*, and 442*d* that operate similarly to sensor A 340 described above to sense toner images formed on their respective photoreceptors.

A sensor B 480 is also shown for the color tandem architecture 400. Sensor B 480 is generally an alternative to using a sensor A 442 for each photoreceptor, although simultaneous use of both sensor A 442 and sensor B 480 is not precluded. Sensor B 480 operates similarly to sensor B 342 described above.

A sensor C 482 is also shown for the color tandem architecture 400. Sensor B 480 is generally an alternative to using either sensor A 442 or sensor B 480, although simultaneous use of two or more of sensor A 442, sensor B 480, and sensor C 482 is not precluded. Sensor C 482 operates similarly to sensor C 344 described above.

The multicolor image that is formed on the intermediate belt 450 is then transferred to receiving material 412, such as paper, by corotron 458. The paper moves in the direction of arrow 414 through fusing station 472. After the transfer of the multicolor image to the receiving material 412, a residue of the multicolor image, represented as toner patch 476, may remain on the intermediate belt 450. Upon completion of transfer of the multicolor image to the receiving material 412, the intermediate belt 450 passes in contact with backing plate 485, to aid in retaining the shape of intermediate belt 450, and continues on to pass through a cleaning station 460 to remove the residual toner patch 476. The intermediate belt 450 then advances around to re-engage photoreceptors 410*a-d* as known in the art.

In one embodiment, a controller 490 provides data and control to the several photoreceptors 410 and associated components. Controller 490 further accepts image data from one or more internal sensors, such as the multiple sensors A 442, sensor B 480 and sensor C 482. In one embodiment, controller 490 further produces page sync signals for each of the photoreceptors 410, including the first photoreceptor 410*a*, the second photoreceptor 410*b*, the third photoreceptor 410*c*, the fourth photoreceptor 410*d*. These page sync signals are provided to a page sync recorder 492. The page sync recorder stores, in one embodiment, time stamps that indicate a relative time between the start of printed of toner images and/or pages of which images are captured by either an internal printer sensor or offline scanner and provided to the analysis processor. The page sync recorder provides page sync signal information, including start of pattern times for each pattern being exposed onto the photoreceptor, to an analysis processor, in a process similar to that described above in relation to FIG. 3. In one embodiment page sync signals are used to assemble multiple images into coherent time domain samples for each photoreceptor that are able to be processed.

The multicolor image forming device 400 operates as described below by exposing multiple patterns, which are separated in time from one another, onto each of the multiple photoreceptors 410*a*, 410*b*, 410*c*, and 410*d*. The start time for exposing each of the patterns, such as through page sync signal information, is stored. Images are created based on the patterns by, for example, one or more of the above described sensors. The created images include separate images that are each associated with one of the multiple photoreceptors. Images for each photoreceptor that are captured by, for example, sensor B 480 or sensor C 482, are created by, for example, color filtering either within the sensor or of the captured image of the exposed pattern. In one embodiment, the images associated with each photoreceptor are then separately analyzed to determine motion of each photoreceptor according to the processing described below.

Example Flow Diagram of One Embodiment

Figure 5:
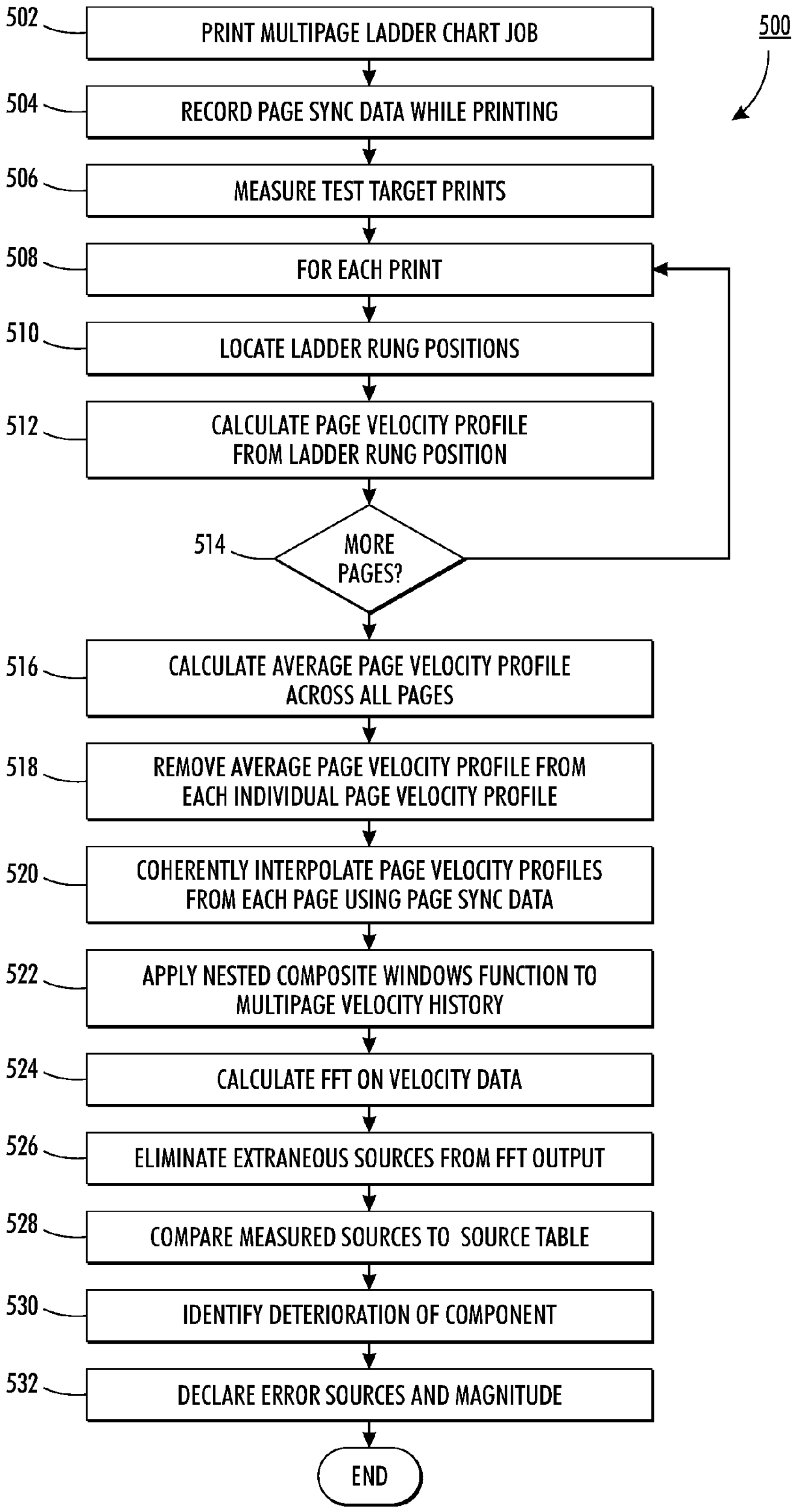
FIG. 5 is a flow diagram of one example embodiment of the present method for analyzing low frequency components of banding defects produced by component velocity variations.

Reference is now made to FIG. 5 which is a flow diagram 500 of one example embodiment of the present method for analyzing low and high frequency components of banding defects produced by component velocity variations At 502, a multiple page ladder chart job is initiated. In one embodiment of the present method, a single print job is printed which consists of repeated pages of the same ladder chart test targets, similar to the ladder test target page 100 of FIG. 1. By way of example, 100 pages of the ladder test target page are printed. Further examples print 10-20 pages based upon the frequency accuracy and resolution across the frequency spectrum of interest. Further embodiments print multiple color separations on the same test target by forming the separate ladder charts across the cross-process dimension of each page.

At 504, sync data is recorded while printing the multiple page ladder chart job, as described above at 502. Page sync data is recorded while printing the ladder chart job. In printer systems that produce multiple color separations, the page sync timing data for each color is recorded. For example, page sync data is stored in one embodiment by the page sync recorder 304 of FIG. 3. By recording the page sync data, the system maintains phase coherency across multiple page ladder chart data even that might contain page-to-page timing variations. Page-to-page timing variations may be small due to the operation of the printer system, or the page-to-page timing variations are able to be quite large due to interruptions for process controls cycles, or other job interruptions. One embodiment hereof detects defects based on an assumption that the defect sources are phase coherent during these interruptions. Further, in one embodiment, the photoreceptor drum maintains its velocity during an interruption, for example, as is commonly the case.

At 506, the printed test target prints are measured. The test target prints can be measured by any suitable means. For example, the test target prints are measured by an in-line full width array sensor on a belt, such as a photoreceptor or intermediate belt, internal to the printer system. Alternatively, the test target patterns are measured by scanning paper printouts produced by the printer system, such as by an offline scanner, including the Image Input Terminal (IIT) on a multifunction printer/copier device (MFD). Measuring test target prints with an offline scanner enables paper alignment during the scanning process such that the motion quality of the scanner is orthogonal to the ladder chart, thereby not including motion quality of the scanner in the data from the ladder chart.

At 508-514, a sequence of steps are performed for each printed page. For each page, ladder rung positions are located, at 510. The first ladder rung is able to be located using well known image processing techniques as well as knowledge of the pattern of the fiducial marks 104, the known position of the ladder chart 102 with respect to the fiducial marks, and the known target geometry. Each subsequent rung on the ladder chart is located using the location of the previous ladder rung, the known geometry of the ladder chart configuration, and the known image processing technique of "centroiding" which is a bootstrapping technique wherein the x,y location of each ladder rung can be determined even if a page is scanned with a modest amount of skew. These techniques obviate image rotation of the scanned images, which is computationally costly. Thus the centroid position of each ladder rung is determined by a position vector. In one embodiment, the position vector, L(i,p), describing the location of ladder rung i on page p in the scanner coordinate system is given by:

$$L(i,p) = \begin{bmatrix} l_x(i,p) \\ l_y(i,p) \end{bmatrix} \quad (1)$$

where $I_x$ and $I_y$ are the x and y components of the vector, respectively.

At 512, for each page, a page velocity profile is calculated based upon the determined ladder rung positions. Based on the target design geometry of the ladder chart target, the centroid locations of each rung are expected to fall at equal distances in a straight line along the process direction. Any variation in the distance between rungs indicates a variation in the photoreceptor surface velocity between the rungs. Thus, the page velocity profile is then calculated from the ladder rung positions, the known process speed, and the known target geometry. The average velocity between rung i and rung i−1. In one embodiment, the velocity v(i,p) at rung i on page p, is given by:

$$v(i,p) = \frac{\|L(i+1,p) - L(i,p)\|_2}{\Delta T} \quad (2)$$

where ΔT is the time between printing rung i and rung i+1, and $\|*\|_2$ is the 2-norm or magnitude of a vector.

The distance between the rung centroids is expected to be the same without regard to the coordinate system used to express the vectors. A coordinate system attached to the paper is used to reference the vectors since the distance variations (and therefore the velocity variation) occur along only one axis of the coordinate system. ΔT is a constant because the geometry of the ladder chart is such that the ladder rungs are a constant (integer) number of scan lines apart. In one embodiment, ΔT is defined as:

$$\Delta T = \frac{N_{scanlines} \times D_{scanline}}{V_{process}} \quad (3)$$

where $N_{scanlines}$ is the (integer) number of scan lines between rung i and rung i+1, $D_{scanline}$ is the distance between scan lines, and $V_{process}$ is the process speed.

The above two steps of locating ladder rung positions, at 510, and calculating page velocity profiles based upon the determined ladder rung positions, at 512, are performed for each printed page being analyzed.

At 516, an average page velocity profile is calculated across all analyzed pages (pages corresponding to the multiple patterns exposed onto the photoreceptor). In one embodiment, the average page velocity profile $\overline{v}(i)$ is defined by:

$$\overline{v}(i) = \frac{1}{P}\sum_{p=1}^{P} v(i,p) \quad (4)$$

where P is the total number of pages used in the analysis, and where v(i,p) is the page velocity profile for page p at rung i.

The individual velocity profiles for each page are averaged together to form an average velocity profile over all pages. Alternatively, an average velocity profile of the photoreceptor over the exposing of the test pattern images onto the photoreceptor is determined. The average velocity profile includes a respective average velocity of the photoreceptor between exposure of each respective image component, such as each rung of a ladder chart, within a uniformly separated set of image components. As described below, processing removes this average velocity profile of the photoreceptor from each page. Removing the average velocity profile removes extraneous frequency components that can appear in the final printed output, such as those that are due to error sources that cause consistent perceived velocity error on each page. Such error sources are able to include, for example, paper stretch in fusing. Further embodiments do not remove the average velocity profile as specified in step 516. For example, some printer engines have a photoreceptor that is synchronous with the page being printed so that a given point on each page is always printed using the same point on the photoreceptor. The process of finding the average page velocity profile and removing it from the data in printer systems with such a printer engine would cause the photoreceptor velocity signal to be removed. Other printer engines have different sized photoreceptors for black and color stations and therefore do not support photoreceptor to page synchronization.

At 518, the average page velocity profile calculated above is removed from each individual page's velocity profile. In one embodiment, the velocity profile $v_m(i,p)$ for page p at rung i with the average page velocity profile $\overline{v}(i)$ of Eq. 5 removed, is given by:

$$v_m(i,p) = v(i,p) - \overline{v}(i). \quad (5)$$

At 520, page velocity profiles from each page are interpolated using page sync data. The velocity profile data for each page are "stitched" together while maintaining phase coherency across all frequencies. This is achieved using the page sync timing data as stored by the page sync recorder. The start time of the page sync data set is used as the initial timing reference point. Alternatively, another fixed point in time is used as the timing reference point. The time relative, given by t(i,p), is the time relative to the start of the data collection for rung i on page p. In one embodiment the time relative is given by:

$$t(i,p)=T(p)+\Delta T_D+(i-1)\bullet\Delta T \quad (6)$$

where T(p) is the time stamp for the page sync associated with page p, and $\Delta T_D$ is the constant time delay from page sync to the first rung in the print target. The "•" symbol represents a scalar product operation.

In order to eliminate the term $\Delta T_D$ from the analysis for simplicity, the reference time for the analysis will be set to the start of the data collection minus the constant delay time from page sync to the first rung in the print target. Again, any fixed point in time can be used for the timing reference—this choice leads to more simplified expressions. In one embodiment, time, $t_D(i,p)$, for rung i on page p relative to the new time reference point, is given by:

$$t_D(i,p)=t(i,p)-\Delta T_D=T(p)+(i-1)\bullet\Delta T \quad (7)$$

As shown, the results are not affected by choice of timing reference.

Directly performing a frequency analysis of the ladder chart pattern over multiple pages assumes that the rung-to-rung time interval for all rungs is expected to be uniform. However, the interval between page syncs, and thus the interval between the last rung of a page and the first rung of the next page, may not in general be an integer multiple of the rung-to-rung time interval within a given page. This is depicted as follows:

$$T(p+1)-T(p)\neq N\bullet\Delta T \quad (8)$$

where N is some integer.

As formulated, ΔT is not a uniform sampling interval that will span all the rungs on all the pages. This condition is able to be remedied by using a double summation reformulation of the discrete Fourier transform incorporating complex arithmetic. Such a remedy does not employ a standard Fast Fourier Transform (FFT) and therefore introduces computational complexity. One embodiment incorporates an interpolation formulation, described herein further with respect to Eq. 11, that allows the use of a standard FFT which can simplify the calculations in certain implementations. In one embodiment, the time samples, $t_s(n)$, where the velocity profile data is interpolated to form uniformly sampled data, is given by:

$$t_s(n)=N\bullet\Delta T \quad (9)$$

where n is the time index.

The data is gathered into vectors. In one embodiment, the vectors X, Y, are defined by:

$$X=\begin{bmatrix} t_D(1,1)\\ t_D(2,1)\\ M\\ t_D(1,2)\\ t_D(2,2)\\ M\\ t_D(i,p)\end{bmatrix},\ Y=\begin{bmatrix} v_m(1,1)\\ v_m(2,1)\\ M\\ v_m(1,2)\\ v_m(2,2)\\ M\\ v_m(i,p)\end{bmatrix}, \quad (10)$$

where $t_D(i,p)$ is the time for rung i on page p relative to the new time reference point (of Eq. 7), and where $v_m(i,p)$ is the velocity profile for page p at rung I (of Eq. 5). In order to avoid artifacts in the interpolation between pages, the vectors of Eq. 10 can be augmented with zero data between pages. Since the average page velocity profile was removed from the velocity data, its average value is zero. Therefore, inserting zero data between pages is possible. Augmented vectors are represented as: $X_A$ and $Y_A$.

In one embodiment, the interpolated velocity profile data, $v_s(n)$, that describes the velocity data on the uniformly spaced in time set of time samples $t_s(n)$ is given as:

$$v_s(n)=f_I(t_s(n);X_A,Y_A) \quad (11)$$

where $f_I(\bullet)$ is an interpolating function. In one embodiment, the interpolation function comprises simple linear interpolation. Higher order interpolation functions can also be incorporated into Eq. 11 in substitution for $f_I(\bullet)$.

The interpolated velocity profile data, $v_s(n)$, represents the photoreceptor velocity sampled with a sampling rate. In one embodiment, the photoreceptor velocity sampling is given by:

$$fs=\frac{1}{\Delta T} \quad (12)$$

By performing the above-described re-sampling, time periods on a subsequent sheet can be corrected based upon the respective distances between each of the image components of the pattern and the start of pattern times for a first page and that subsequent page. This correction operates to maintain phase coherency over all the pages in the job.

At 522, a nested composite window function is applied to the multipage velocity history. The data contained in the interpolated velocity profile data, $v_s(n)$, is now ready for Fourier analysis. However, immediate application of the FFT causes extra fictitious "sidelobe" tones due to the multiple "windowing" of the collected multiple page data. For the assembly of multiple page data, an effective observation time for each printed page operates to create fictitious sidelobe tones, as well as the "window" that exists for the total assembly of the multiple printed page. Sampled data that is collected over an observation period and is not further "sub-windowed," such as by the "window" of each page, is preferably handled using standard FFT windowing functions, such as a Hanning, which are well known in this art. However for windowed sampled data, such as the velocity data on each cut sheet page that is then assembled into a composite data set as in the case here, a separate windowing function such as, for instance, different Hanning windows, is applied to both the page level data and to the assembled data. For example, one embodiment applies a first Hanning window to the time period data determined for each page image, and applies a second Hanning window to the assembled time period data (after applying the first Hanning window to each page) assembled for all of the several pages. Applying this nested composite window results in adequately reducing the sidelobe tones caused by the time windowed collected data. This approach is referred to herein as a "nested composite" windowing function.

At 524, an FFT is calculated for the velocity data. A standard FFT is then performed on the assembled data after the nested composite windowing function has been applied.

At 526, extraneous sources are removed from the FFT output. Such extraneous sources include, for example, gaps in the time domain data that exist due to the physical gaps in printed pages. The extraneous source frequency components of these gaps in time domain data can be determine by applying the linear transform theory of, for example, discrete time Fourier transforms to the known gap data. The determined extraneous source frequency components are then able to be removed from the FFT output.

At 528, the measured frequency sources within the calculated FFT of the photoreceptor velocity data are compared to data in a corresponding source defect table. In one embodiment, the tones detected by the FFT and remaining after the above-described processing are compared to a table of known photoreceptor velocity change sources. A list of such source frequencies is generally known for each printer based on process speed and mechanical design. In one embodiment, a description of at least one component within the printer and respective critical frequency values for each component are stored for subsequent retrieval. The description and respective critical frequency values are able to be stored in, for example, a non-volatile memory.

Based upon a correlation between one of the critical frequency values and a detected frequency component, a deterioration of a component within the printer is identified, at 530. In one embodiment, the identification of the deterioration of the component is based upon the comparison performed in the previous step. For example, if a frequency component with an appreciable amplitude is detected and the above comparison associates that frequency with a particular component within the printer, a deterioration of that associated component is identified. Error sources and magnitudes can further be identified.

At 532, the diagnostic system outputs error sources and magnitudes to a device operator. Other diagnostics, such as strength of their fundamental frequencies and their harmonics, can additionally be output. Thereafter, the user or key operator of the system can perform a maintenance function on the system by repairing or replacing, or further monitoring, the identified component associated the identified deterioration condition. Further embodiments are able to, for example initiate an alert to an operator through a notification interface. The notification interface is able to, for example, flash a light or sound an audible alarm, display messages on a device control panel or operator's station, and send text/email messages to service personnel responsible for maintenance of the printer. The notification interface may further contact a key operator of the device or a manager thereof via, for example, a cellular communications link and play a pre-packaged message or leave a voicemail. Alternatively, any suitable indication is given to an operator of the device, customer service representative, manufacturers representative, or to a manager. Such an alert may include an indication of a deterioration of one or more components of the digital imaging system, or an indication of at least one part that is deteriorating based upon the detected frequency component and its amplitude. A networked database or local storage may further be queried for a list of possible solutions or actions to be taken based upon the conditions which precipitated the alert.

Various Other Embodiments

Figure 6:
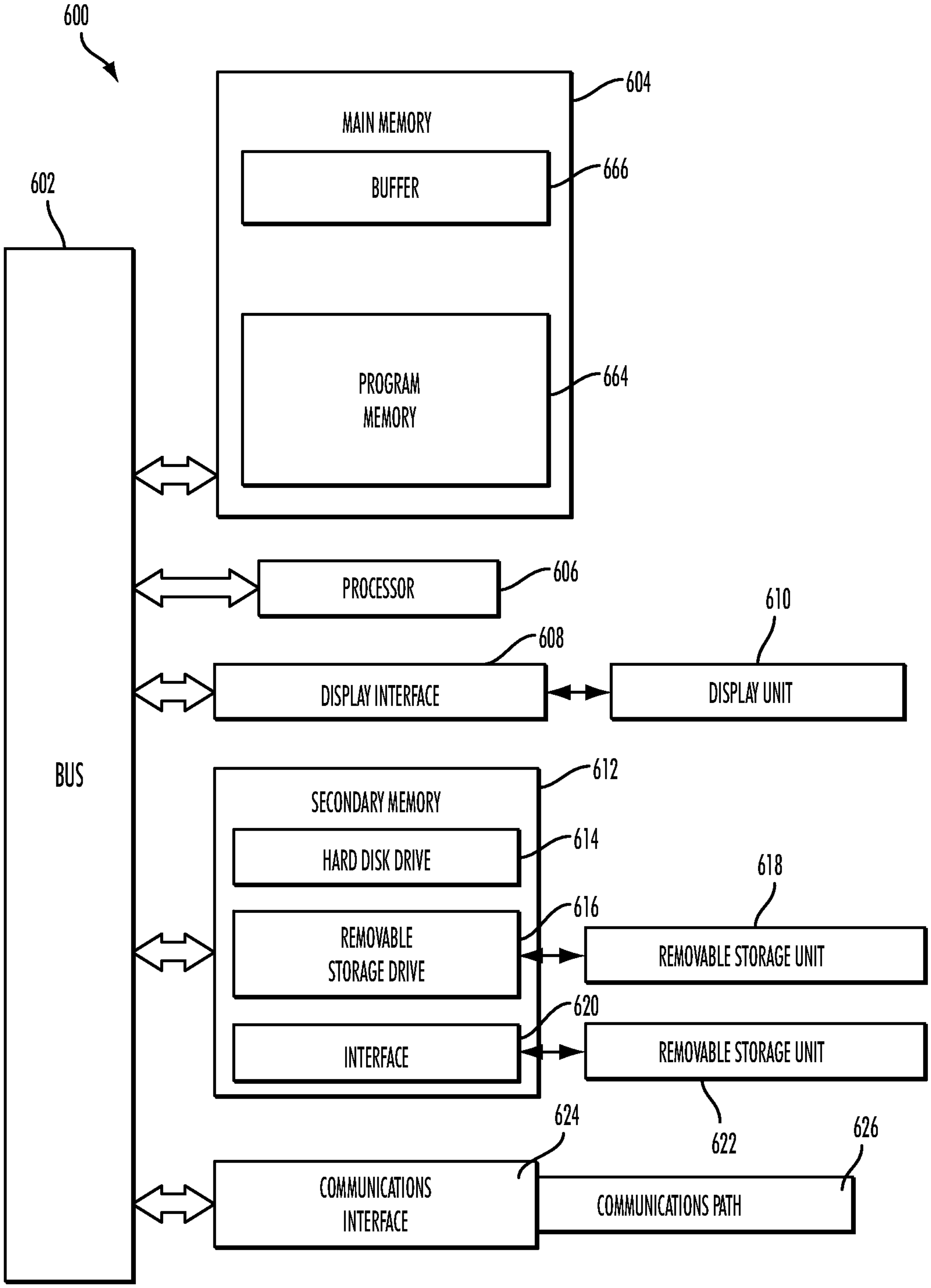
FIG. 6 illustrates a block diagram of one example embodiment of a special purpose computer useful for implementing one or more aspects of the present method.

Reference is now made to FIG. 6 which illustrates a block diagram of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the embodiments described herein with respect to FIGS. 1-4 and the flow diagram of FIG. 5.

Special purpose computer system 600 includes processor 606 for executing machine executable program instructions for carrying out all or some of the present method. The processor is in communication with bus 602. The system includes main memory 604 for storing machine readable instructions. Main memory may comprise random access memory (RAM) to support reprogramming and flexible data storage. Buffer 666 stores data addressable by the processor. Program memory 664 stores machine readable instructions for performing the present method. A display interface 608 forwards data from bus 602 to display 610. Secondary memory 612 includes a hard disk 614 and storage device 616 capable of reading/writing to removable storage unit 618, such as a floppy disk, magnetic tape, optical disk, etc. Secondary memory 612 may further include other mechanisms for allowing programs and/or machine executable instructions to be loaded onto the processor. Such mechanisms may include, for example, a storage unit 622 adapted to exchange data through interface 620 which enables the transfer of software and data. The system includes a communications interface 624 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 626 which carries such signals and may be implemented using wire, cable, fiber optic, phone line, cellular link, RF, memory, or other means known in the arts.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that the flow diagrams hereof are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for estimating photoreceptor motion quality in a printer, the method comprising:

exposing, within a printer having an exposure module and a moving photoreceptor, a first pattern and a second pattern onto the photoreceptor, the first pattern comprising a first set of image components that are transverse to a motion of the photoreceptor and the second pattern comprising a second set of image components that are transverse to the motion of the photoreceptor, the exposing of the first pattern starting at a first start time and the exposing of the second pattern starting at a second start time subsequent to the exposing of the first pattern;

storing the first start time and the second start time;

creating, in response to the exposing, a first image capturing the first pattern and a second image capturing the second pattern determining, based upon respective distances between adjacent image components captured within the first image, a first set of photoreceptor velocity values indicating respective velocities of the photoreceptor between exposing each image component within the first image;

determining, based upon respective distances between adjacent image components captured within the second image, a second set of photoreceptor velocity values indicating respective velocities of the photoreceptor between exposing each image component within the second image;

combining, based on the first start time and the second start time, the first set of photoreceptor velocity values and the second set of photoreceptor velocity values into a phase coherent composite set of photoreceptor velocity values that indicate photoreceptor velocity during exposing the first pattern and the second pattern, the phase coherent composite set of photoreceptor velocity values comprising photoreceptor velocity values for the first pattern and for the second pattern that are all separated by a uniform time interval;

determining, based on a frequency transform of the phase coherent composite set of photoreceptor velocity values, respective frequency components for the velocity of the photoreceptor during exposing of the first pattern and the second pattern; and outputting data derived from the respective frequency components.

2. The method of claim 1, wherein at least of the first pattern and the second pattern comprises uniformly spaced parallel lines that are transverse to the motion of the photoreceptor.

3. The method of claim 1, wherein exposing the first pattern and the second pattern is separated by exposing user data defining at least one printed sheet onto the photoreceptor.

4. The method of claim 1, wherein the creating the first image and the second image comprises:

transferring each of the first image and the second image to a respective sheet of paper; and optically scanning the respective sheet of paper for each of the first image and the second image.

5. The method of claim 1, wherein the creating the first image and the second image comprises:

adhering, in response to the exposing, toner to the photoreceptor, the toner adhering according to a the first pattern and the second pattern; and sensing, in response to the adhering, toner adhering to the photoreceptor, wherein the the first image and the second image is defined by the toner adhering to the photoreceptor.

6. The method of claim 1, wherein the first set of image components and the second set of image components comprise a plurality of colors, and wherein the determining the first set of photoreceptor velocity values, the determining the second set of photoreceptor velocity values, the combining, and the determining respective frequency components operate separately on each color of the plurality of colors within the the first pattern and the second pattern.

7. The method of claim 1, wherein the exposing and the creating are performed between printing consecutive sheets containing non test pattern images on the printer.

8. The method of claim 1, wherein the creating the first image and the second image comprises transferring the first pattern and the second pattern to an intermediate transfer media within the printer.

9. The method of claim 8, wherein the exposure module further comprises at least one additional photoreceptor, wherein the exposing comprises exposing at least one additional first pattern and at least one additional second pattern onto the at least one additional photoreceptor, the method further comprising:

creating at least one additional first image and at least one additional second image, the creating at least one additional first image and at least one additional second image comprising transferring patterns from the at least one additional photoreceptor to the intermediate transfer media, storing a respective additional first start time and a respective additional second start time for each of the at least one additional first image and each of the at least one additional second image determining, based upon respective distances between adjacent image components captured within the at least one additional first image, an at least one additional respective first set of photoreceptor velocity values indicating respective velocities of the respective photoreceptor within the at least one additional photoreceptor between exposing each image component within the at least one additional first image;

determining, based upon respective distances between adjacent image components captured within the at least one additional second image, an at least one additional respective second set of photoreceptor velocity values indicating respective velocities of the respective photoreceptor within the at least one additional photoreceptor between exposing each image component within the at least one additional second image;

combining, based on the respective additional first start time and the respective additional second start time, the first set of photoreceptor velocity values and the second set of photoreceptor velocity values into a phase coherent composite set of respective additional photoreceptor velocity values that indicate respective photoreceptor velocity during exposing the at least one additional first pattern and the at least one additional second pattern; and determining, based on a frequency transform of the phase coherent composite set of respective additional photoreceptor velocity values, respective frequency components for the velocity of the respective photoreceptor within the at least one additional photoreceptor during exposing of the at least one additional first pattern and the at least one additional second pattern.

10. The method of claim 9, wherein the creating the at least one additional first image and the at least one additional second image comprises sensing the at least one additional first image and the at least one additional second image on an intermediate belt.

11. The method of claim 1, further comprising applying, prior to determining the respective frequency components, a first window to each of the first set of photoreceptor velocity values and the second set of photoreceptor velocity values, and applying, subsequent to applying the first window, a second window to the phase coherent composite set of photoreceptor velocity values.

12. The method of claim 1, further comprising:

determining an average velocity profile for the first set of photoreceptor velocity values and the second set of photoreceptor velocity values, the average velocity profile comprising a respective average velocity of the photoreceptor between exposure of each respective image component within the first pattern and the second pattern; and removing, prior to determining respective frequency components, the average velocity profile of the photoreceptor from the first set of photoreceptor velocity values and the second set of photoreceptor velocity values.

13. The method of claim 1, further comprising:

storing a description of at least one component within the printer and a respective critical frequency value for each component;

determining a correlation between one of the respective critical frequency value and a frequency component within the respective frequency components; and identifying, based on the correlation, a deterioration of a component within the printer.

14. A system for estimating photoreceptor motion quality in a printer, the system comprising:

a memory;

a storage medium for storing data; and a processor in communication with said storage medium and said memory, said processor executing machine readable instructions for performing the method of:

exposing, within a printer having an exposure module and a moving photoreceptor, a first pattern and a second pattern onto the photoreceptor, the first pattern comprising a first set of image components that are transverse to a motion of the photoreceptor and the second pattern comprising a second set of image components that are transverse to the motion of the photoreceptor, the exposing of the first pattern starting at a first start time and the exposing of the second pattern starting at a second start time subsequent to the exposing of the first pattern;

storing the first start time and the second start time;

creating, in response to the exposing, a first image capturing the first pattern and a second image capturing the second pattern;

determining, based upon respective distances between adjacent image components captured within the first image, a first set of photoreceptor velocity values indicating respective velocities of the photoreceptor between exposing each image component within the first image;

determining, based upon respective distances between adjacent image components captured within the second image, a second set of photoreceptor velocity values indicating respective velocities of the photoreceptor between exposing each image component within the second image;

combining, based on the first start time and the second start time, the first set of photoreceptor velocity values and the second set of photoreceptor velocity values into a phase coherent composite set of photoreceptor velocity values that indicate photoreceptor velocity during exposing the first pattern and the second pattern, the phase coherent composite set of photoreceptor velocity values comprising photoreceptor velocity values for the first pattern and for the second pattern that are all separated by a uniform time interval;

determining, based on a frequency transform of the phase coherent composite set of photoreceptor velocity values, respective frequency components for the velocity of the photoreceptor during exposing of the first pattern and the second pattern; and outputting data derived from the respective frequency components.

15. The system of claim 14, the method further comprising applying, prior to determining the respective frequency components, a first window to each of the first set of photoreceptor velocity values and the second set of photoreceptor velocity values, and applying, subsequent to applying the first window, a second window to the phase coherent composite set of photoreceptor velocity values.

16. The system of claim 14, the method further comprising:

determining an average velocity profile for the first set of photoreceptor velocity values and the second set of photoreceptor velocity values, the average velocity profile comprising a respective average velocity of the photoreceptor between exposure of each respective image component within the first pattern and the second pattern; and removing, prior to determining respective frequency components, the average velocity profile of the photoreceptor from the first set of photoreceptor velocity values and the second set of photoreceptor velocity values.

17. The system of claim 14, the method further comprising:

storing a description of at least one component within the printer and a respective critical frequency value for each component;

determining a correlation between one of the respective critical frequency value and a frequency component within the respective frequency components; and identifying, based on the correlation, a deterioration of a component within the printer.

18. A method for estimating photoreceptor motion quality in a printer, the method comprising:

exposing, within a printer having an exposure module and a moving photoreceptor, a first ladder chart pattern and a second ladder chart pattern onto the photoreceptor, each of the first ladder chart pattern and the second ladder chart pattern having rungs that are transverse to a motion of the photoreceptor, the exposing of the first ladder pattern starting at a first start time and the exposing of the second ladder pattern starting at a second start time subsequent to the exposing of the first ladder pattern;

storing the first start time and the second start time;

printing the first ladder pattern and the second ladder pattern exposed on the photoreceptor on a respective sheet of paper;

scanning, in response to the printing, each respective sheet of paper to capture a first image capturing the first ladder pattern and a second image capturing the second ladder pattern the first image and the second image comprising a respective scanned image of the respective sheet of paper;

determining, based upon respective distances between adjacent rungs scanned within the first image, a first set of photoreceptor velocity values indicating respective velocities of the photoreceptor between exposing rung within the first image;

determining, based upon respective distances between adjacent rungs scanned within the second image, a second set of photoreceptor velocity values indicating respective velocities of the photoreceptor between exposing each rung within the second image;

combining, based on the first start time and the second start time, the first set of photoreceptor velocity values and the second set of photoreceptor velocity values into a phase coherent composite set of photoreceptor velocity values that indicate photoreceptor velocity during exposing the first pattern and the second pattern, the phase coherent composite set of photoreceptor velocity values comprising photoreceptor velocity values for the first pattern and for the second pattern that are all separated by a uniform time interval;

performing a fast Fourier transform on the phase coherent composite set of photoreceptor velocity values to determine respective frequency components for the velocity of the photoreceptor during exposing of the first ladder pattern and the second ladder pattern; and outputting an indication of a failed component within the printer based upon values of the respective frequency components.

19. A method for estimating photoreceptor motion quality in a printer, the method comprising:

exposing onto each photoreceptor within a plurality of photoreceptors, within a printer having an exposure module comprising the plurality of photoreceptors in contact with an intermediate belt, a respective first pattern and a respective second pattern, each of the respective first pattern and the respective second pattern being associated with a photoreceptor within the plurality of photoreceptors, each respective first pattern comprising a respective first set of image components that are transverse to a motion of its associated photoreceptor and the respective second pattern comprising a respective second set of image components that are transverse to the motion of its associated photoreceptor, the exposing of the respective first pattern starting at a respective first start time and the exposing of the respective second pattern starting at a respective second start time subsequent to the exposing of the respective first pattern;

storing each of the respective first start time and the respective second start time;

creating, in response to the exposing, a respective first image capturing the respective first pattern and a respective second image capturing the respective second pattern;

determining, based upon distances between adjacent image components captured within each of the respective first image, a respective first set of associated photoreceptor velocity values indicating respective velocities of each respective associated photoreceptor between exposing each image component within the respective first image;

determining, based upon distances between adjacent image components captured within each of the respective second image, a respective second set of associated photoreceptor velocity values indicating respective velocities of each respective associated photoreceptor between exposing each image component within the respective second image;

combining, based on the respective first start time and the respective second start time, each of the respective first set of associated photoreceptor velocity values and each of the respective second set of associated photoreceptor velocity values into a respective phase coherent composite set of associated photoreceptor velocity values that indicate respective associated photoreceptor velocity during exposing each of the respective first pattern and each of the respective second pattern, each of the respective phase coherent composite set of associated photoreceptor velocity values comprising respective associated photoreceptor velocity values for each of the respective first pattern and for each of the respective second pattern that are all separated by a uniform time interval;

determining, based on a frequency transform of the phase coherent composite set of photoreceptor velocity values, respective frequency components for the velocity of the photoreceptor during exposing of the first pattern and the second pattern; and outputting data derived from the respective frequency components.

20. The method of claim 19, wherein the creating the respective first image and the respective second image comprises:

transferring the each respective first pattern and the each respective second pattern from each associated photoreceptor within the plurality of photoreceptors to the intermediate belt within the printer; and sensing the each respective first pattern and the each respective second pattern on the intermediate belt.

21. The method of claim 19, wherein each photoreceptor within the plurality of photoreceptors prints a respective color component, and wherein the determining the respective first set of photoreceptor velocity values, the determining the respective second set of photoreceptor velocity values, the combining, and the determining each respective frequency components operate separately on each of the respective color components.

* * * * *